Aug. 9, 1949.  C. ESLECK  2,478,813
LAWN EDGER
Filed Dec. 13, 1946  2 Sheets-Sheet 1

Inventor
Clyde Esleck
By E. V. Hardway
Attorney

Aug. 9, 1949.                C. ESLECK                2,478,813
                             LAWN EDGER
Filed Dec. 13, 1946                              2 Sheets-Sheet 2
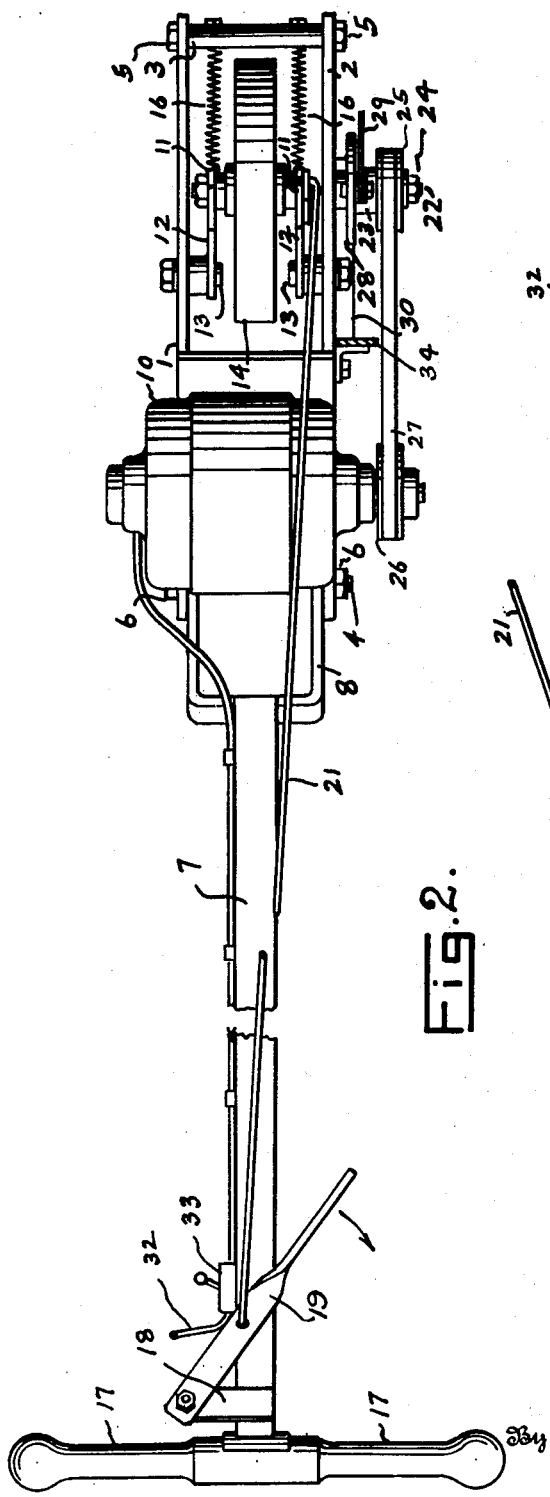
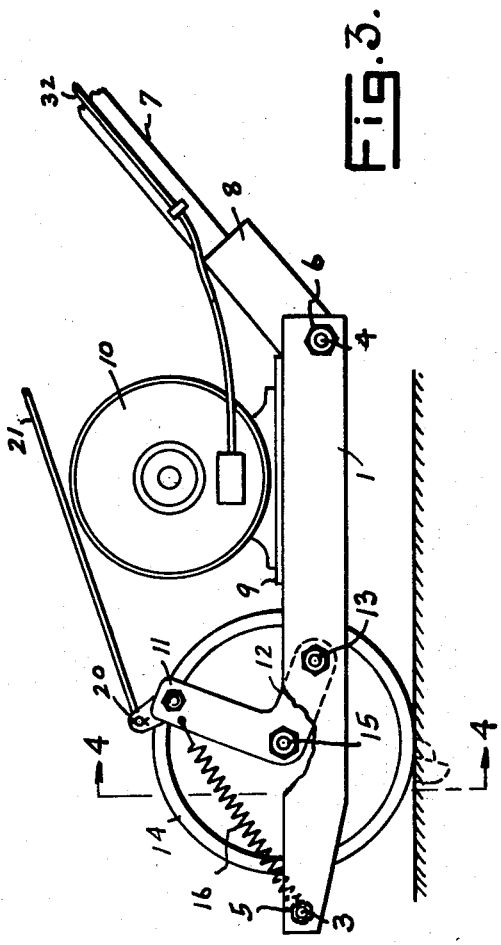
Inventor
Clyde Esleck
E. V. Hardway
Attorney Patented Aug. 9, 1949

2,478,813

UNITED STATES PATENT OFFICE 2,478,813

LAWN EDGER

Clyde Esleck, Houston, Tex., assignor to Lawn Equipment Company, Harris County, Tex., a corporation of Texas Application December 13, 1946, Serial No. 716,074

4 Claims. (Cl. 56—25.4)

This invention relates to a lawn edger and has particular relation to an implement of the character described specially designed for cutting grass and the like.

In the present illustration the implement is shown as an edger wherein the blades work in a vertical plane although, as is obvious, the cutters may be positioned to work in a horizontal plane.

An object of the present invention is to provide an implement of the character described embodying a rotatable disc with cutters pivotally connected thereto and adapted to be maintained in cutting position by the centrifugal force of the disc and cutters. The advantage of this arrangement is that should a cutter strike a fixed object it will yield and not become broken.

Another object of the present invention is to provide an implement of the character described embodying a frame, a carrier wheel supporting the frame, a blade carrying disc rotatably mounted on the frame and having momentum blades pivoted thereon with means for rotating the disc.

It is another object of the present invention to provide an implement of the character described wherein the frame may be readily adjusted vertically relative to the carrier wheel by the operator and while the implement is in operation.

The invention also embodies means for guiding the implement, when used as a trimmer, relative to the side walk, or curbing.

Other objects and advantages will be apparent from the following specification which is illustrated by the accompanying drawings, wherein—

Figure 2 is a plan view thereof.

Figure 3 is a fragmentary, side view showing the frame in elevated position relative to the ground wheel.

Figure 1:
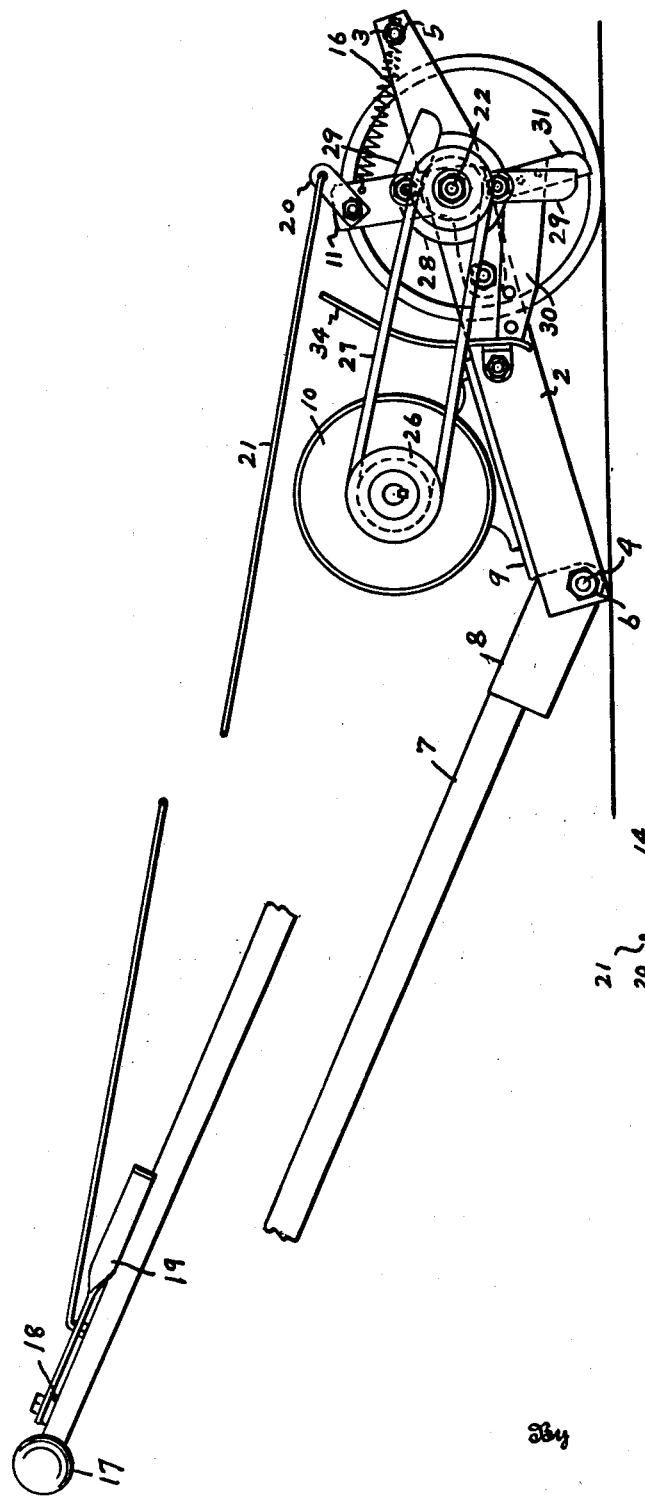
Figure 1 is a side view of the implement shown in inactive position.

Referring now more particularly to the drawings wherein like numerals of reference designate the same parts in each of the figures, the numerals 1 and 2 designate similar side members preferably formed of metal bars and which are connected at their front and rear ends by the transverse rods 3 and 4 whose ends are reduced and fitted through said side members and externally threaded to receive the securing nuts 5, 5 and 6, 6. The side bars and rods form a main frame.

The numeral 7 designates the handle whose inner end is formed into a U-shaped member 8 whose side arms are secured to the rear cross rod 4, as shown in Figures 2 and 3.

Mounted on the rear end of the frame there is a platform 9 provided to support the motor 10.

An electric motor is shown in the present illustration although any other type of motor may be employed.

There are the bell cranks having the upstanding arms 11, 11 and also having the rearwardly extending arms 12, 12. The free ends of the rearwardly extending arms are pivotally connected to the side members 1, 2 by means of similar spindles 13, 13.

Between these bell cranks there is the ground wheel 14 which is mounted to rotate on an axle 15 and the ends of this axle are secured to the respective bell cranks.

Strong coil springs 16, 16 are connected, at their forward ends, to the rod 3 and at their rear ends to the upper ends of the bell crank arms 11.

Secured to the rear end of the handle 7 there is a transverse grip member having hand grips 17, 17 and secured to the handle 7 in front of the grip member there is a transversely disposed bar 18 to the free end of which one end of the hand lever 19 is pivoted.

On the upper end of one of the arms 11 there is mounted an adjustable lug 20 which is normally maintained in fixed relation to said arm 11 but which may be adjusted forwardly or rearwardly.

A control rod 21 is pivotally connected, at one end, to the lug 20 and is pivotally connected, at its other end, to the hand lever 19.

The operator may operate the lever 19 in the direction indicated by the arrow in Figure 2 thus exerting a pull, through the rod 21, on the bell crank arm 11 and this pull will operate, through the bell cranks, to lower the frame relative to the ground wheel. Upon release of the lever 19 the springs 16 will operate the bell cranks in the opposite direction thus elevating the frame relative to the ground wheel. The axle 15 clamps the bell cranks together as a unit.

Fixed to and extending laterally from the side member 2 of the frame there is a spindle 22 and rotatably mounted on this spindle there is a hub 23 which is maintained against detachment by the nut 24.

Fixed on the outer end of this hub there is a sheave 25 which is in alignment with a corresponding sheave 26 which is fixed on the shaft of the motor 10 and operating over these sheaves there is a driving belt 27 whereby the sheave 25 and hub 23 are rotated from the motor.

Fixed on the inner end of the hub 23 there is a disc 28.

Figure 4:
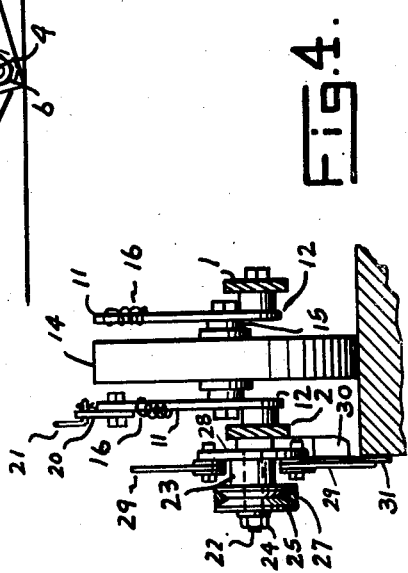
Figure 4 is a fragmentary, transverse, sectional view taken on the line 4—4 of Figure 3.

There are the cutter blades 29, 29, two being shown although a greater number may be employed if desired. The inner ends of these cutter blades are pivotally mounted on suitable spindles on opposite margins of the disc 28, as shown in Figures 1 and 4.

Secured to the outer side of the side member 2 of the frame there is a forwardly extended bracket 30 which declines forwardly relative to said side member and secured to the forward end of this bracket and depending therefrom there is a plate-like guide 31 which is provided to move alongside the walkway, or curb, so as to guide the implement. The blades 29 co-operate, to a certain extent, with this guide with shear like effect to trim the grass or other growth, although the blades have sufficient momentum to cut the grass, of themselves.

In the present illustration, an electrical conductor 32 leads from a suitable source of electrical energy and is connected to the motor. It is equipped with a conventional switch 33 whereby the circuit may be completed or broken.

In operation the grip members 17 will be held by the operator so as to maintain the frame in approximately parallel relation with the surface over which the implement moves and the operator maintains a grip on the lever 19 so as to create a tension on the rod 21 to hold the frame at the desired elevation relative to the carrier wheel 14. The lever 19 may be moved by the operator to maintain the desired level and this will control the depth of the cut since the disc 28 carrying the cutters is mounted on the frame and moves up and down with it.

While in operation the disc rotates at a high rate of speed so that the blades 29 will be held in cutting position by centrifugal force but should a blade strike a fixed object it will yield and will not be liable to be broken off.

When the lever 19 is released by the operator the pull spring 16 will operate to elevate the frame and the blades will be carried upwardly to inoperative position above the work.

It is obvious that should a blade become broken, or dulled, it may be easily replaced with a new one.

It is obvious that by suitable gearing the disc 28 and blades 29 may be positioned to rotate in a horizontal plane.

It will be noted that the cutters 29 rotate about a common vertical center with the ground wheel 14 so that if the handle 7 is moved laterally, in propelling the machine along, the guide 31 will still remain closely adjacent the walk, or curb, so that the edge trimmed will be comparatively straight. This arrangement may be considered to be such that the rotational axes of the support wheel 14 ad the blade carrier or disc 28 appear to be in substantial alignment when the edge cutter is viewed in top plan, as for instance in Fig. 2. Guide 31 is carried by the frame part 2 so as to depend alongside the plane in which blade carrier 31 and blades 29 rotate. This guide also appears to be in substantial alignment with the support wheel and blade carrier rotational axes with the machine viewed in top plan. This relative location of these parts facilitates edging along a curved line in an even or uniform manner.

It is to be understood that as the bell cranks are moved about their pivot, the rotational axis of the support wheel and that of the carrier disc 28 will substantially coincide when the support wheel is positioned at one point along its arc of movement and that these axes always appear in substantial alignment when the machine is viewed in top plan. This is because the vertical component of the movement of the wheel greatly predominates the horizontal component of this movement through the usual movement of the support wheel axis.

As is shown in Figures 1 and 2 there is an arcuate upstanding guard 34 whose lower end is fastened to the side member 2 and which is aligned behind the cutter blades. This guard is provided to prevent grass and dirt from being thrown rearwardly onto the operator.

The drawings and description are illustrative merely while the broad principle of the invention will be defined by the appended claims.

What I claim is:

1. An edge cutter comprising a frame having a support wheel, a rotatable blade carrier, a substantially horizontal bearing means mounted on the frame and supporting the carrier, a cutter blade carried by and projecting from the carrier, the axes of said wheel and carrier being substantially in alignment when the edge cutter is viewed in top plan.

2. The combination of claim 1 with a guide member mounted on the frame and extending downwardly therefrom to the side of the plane in which the cutter carrier and blade rotate and in substantial alignment with the rotational axes of the support wheel and blade carrier when the edge cutter is viewed in top plan.

3. The combination of claim 1 wherein the support wheel is adjustably mounted on the frame to vary its vertical position relative thereto to provide for regulation of the cutting position of the blade carrier and cutter blade.

4. In an edge cutter, a frame, bell crank means pivotally connected to the frame, a support wheel rotatably mounted on the bell crank means eccentric to the pivotal connection, control means connected to the bell crank means to determine the pivotal position thereof with the ground wheel spaced from the pivotal connection in the line of intended travel of the edge cutter and to move the bell crank means about its pivot to raise or lower the frame relative to the support wheel, a rotatable blade carrier, a substantially horizontal bearing means mounted on the frame with its bearing axis such as to substantially coincide with the axis of rotation of the support wheel at one of its positions along its arc of movement, a blade carrier journaled in the bearing means, and a cutter blade carried by and projecting from the carrier, whereby in operation upon adjusting the vertical position of the support wheel relative to the frame the rotational axes of the support wheel and blade carrier remain in substantial alignment with the edge cutter viewed in top plan.

CLYDE ESLECK.

REFERENCES CITED

The following references are of record in the file of this patent:

UNITED STATES PATENTS

| Number | Name | Date |
|---|---|---|
| 223,505 | Hanley | Jan. 13, 1880 |
| 1,555,011 | Keith | Sept. 29, 1925 |
| 1,868,918 | Schenk | July 26, 1932 |

FOREIGN PATENTS

| Number | Country | Date |
|---|---|---|
| 16,429 | Australia | Oct. 25, 1928 |